United States Patent [19]

O'Sullivan

[11] 3,742,133

[45] June 26, 1973

[54] MONITORING SYSTEM

[75] Inventor: Joseph L. O'Sullivan, Milton, Mass.

[73] Assignee: Seaboard Systems, Inc., Randolph, Mass.

[22] Filed: Sept. 15, 1971

[21] Appl. No.: 180,804

[52] U.S. Cl. .............................. 178/6, 178/DIG. 13

[51] Int. Cl. .......................... H04n 7/02, H04n 7/18

[58] Field of Search .................... 178/5.6, 6, DIG. 1, 178/DIG. 38, 6.8, DIG. 6, DIG. 13, DIG. 33

[56] References Cited

UNITED STATES PATENTS

| | | | |
|---|---|---|---|
| 2,146,512 | 2/1939 | Phinney | 178/DIG. 1 |
| 3,480,727 | 11/1969 | Moore et al. | 178/6 |
| 3,482,037 | 12/1969 | Brown et al. | 178/6 |

*Primary Examiner*—Robert L. Griffin
*Assistant Examiner*—John C. Martin
*Attorney*—Wolf, Greenfield and Sacks

[57] ABSTRACT

The system is for use in an apartment house or other multi-unit dwelling and generally includes a central station which is preferably in the lobby of the apartment house and a plurality of unit stations, one being associated with each unit of the apartment house. The central or lobby station includes a plurality of manually actuable switches, one identifying each apartment unit, a television camera and a speaker/microphone arrangement for communicating with an occupant of the apartment house. Each unit station similarly includes a corresponding speaker/microphone arrangement, along with a lobby door release switch, a television receiver and a talk/listen switch. In accordance with the invention circuitry including relay and delay means are also located in the central station and unit stations.

When one of the switches in the lobby is depressed and the television receiver in the corresponding unit is on, the video signal from the lobby camera automatically overrides the video signal of the tuned-in station regardless of which station is tuned-in and the occupant can immediately observe the lobby area to determine whether or not to actuate the door release switch.

18 Claims, 1 Drawing Figure

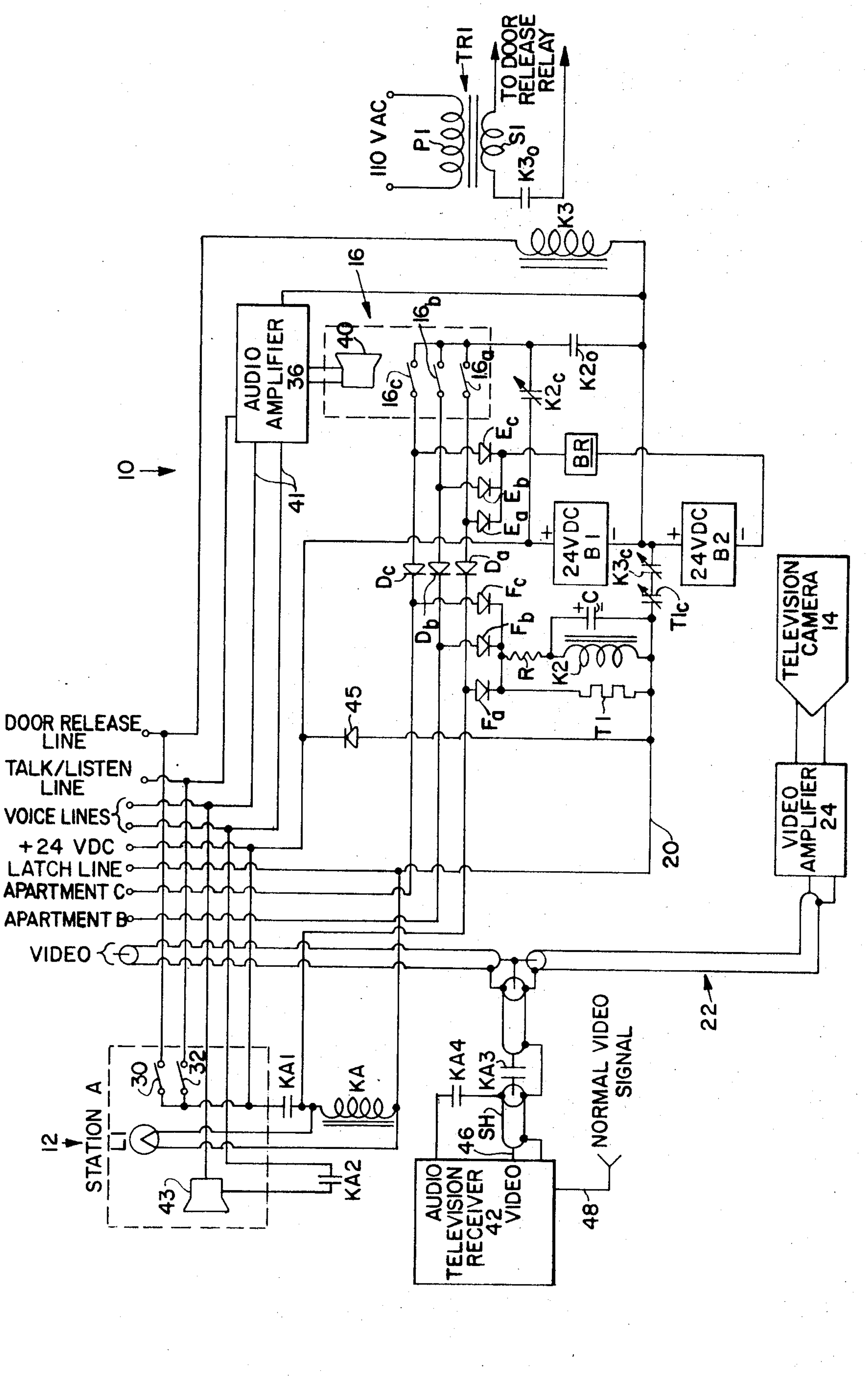
110 VAC
P1
TR1
S1
K3o
TO DOOR RELEASE RELAY
K3
16
AUDIO AMPLIFIER 36
40
16b
16a
16c
K2c
K2o
10
41
BR
24VDC B1
24VDC B2
K3c
T1c
TELEVISION CAMERA 14
VIDEO AMPLIFIER 24
R
K2
C
T1
45
20
22
DOOR RELEASE LINE
TALK/LISTEN LINE
VOICE LINES
+24 VDC
LATCH LINE
APARTMENT C
APARTMENT B
VIDEO
STATION A
12
30
32
KA1
KA
L1
43
KA2
KA4
KA3
46
SH
AUDIO TELEVISION RECEIVER 42 VIDEO
NORMAL VIDEO SIGNAL
48

MONITORING SYSTEM

FIELD OF THE INVENTION

The present invention relates in general to a monitoring system preferably for use in an apartment house or the like which enables each occupant of the apartment house to readily observe the lobby area or other like area when the lobby switch identifying that unit has been actuated. More particularly, the present invention is concerned with a security monitoring system employing a television camera in the lobby and a television receiver in each apartment unit which automatically immediately displays a picture of the lobby area when the associated lobby switch is actuated and regardless of which television station is being watched prior to such actuation.

BACKGROUND OF THE INVENTION

In most apartment houses, particularly the larger unit buildings there has been a longstanding problem in that the occupant in any one apartment unit may be remotely located from the main entrance lobby and thus it has been difficult for the occupant to determine whether or not to allow entry to a person who has signaled the occupant's apartment unit by actuating the associated switch in the lobby. One well known means for assisting the occupant in identifying the person in the lobby has been a speaker/microphone arrangement interconnecting the main entrance lobby and each unit. One of the primary disadvantages to this technique is that generally speaking it is difficult to accurately recognize the voice of the person in the lobby. Also, the person seeking entry may falsely identify himself to thereby gain entry.

Another recently used means for identifying the person seeking entry is a television camera located in the main entrance lobby and a television receiver in each apartment unit. When the person in the lobby buzzes a particular apartment unit the occupant, if the television is on, switches to a predetermined channel, one not normally used for normal television reception, and can then observe the lobby area. In this way the occupant can identify the entry seeker and either release (open) the lobby door or not. One of the drawbacks associated with this last technique of identification is that the occupant is required to turn to the predetermined channel before the lobby area can be observed. This makes it quite difficult for elderly or bedridden people to ascertain whom is at the lobby entrance. Another drawback associated with being able to select the predetermined channel is that some apartment dwellers can use the television camera in the lobby as their own "peeping tom" arrangement wherein they can observe all happenings in the lobby area simply by tuning-in to the predetermined channel. With the present invention it is not necessary to tune to any predetermined channel and it is not possible to continuously observe the lobby area from an apartment unit. The lobby area is preferably only observable when a person seeks entry by actuating the associated lobby switch.

OBJECTS OF THE INVENTION

Accordingly, it is a primary object of the present invention to provide a television monitoring system preferably for use in an apartment house having a main entrance lobby with a television camera and a plurality of apartment units each with a television receiver, wherein when one of the lobby switches associated with a particular apartment is actuated the video signal from the lobby camera immediately overrides the video signal from a tuned-in station regardless of which station is tuned in.

Another object of the present invention is to provide a television monitoring system in accordance with the primary object which also provides for audio communication between the main entrance lobby and the selected apartment unit when the associated lobby switch has been actuated.

Still another object of the present invention is to provide a television monitoring system in accordance with the primary object that includes means for enabling signaling to only one apartment unit at a time thereby preventing an entry seeker from deliberately actuating a plurality of lobby switches and causing communication with many units. Without this feature of the present invention the system might be overloaded.

A further object of the present invention is to provide a television monitoring system in accordance with the primary object that includes storage means in each unit, responsive to as associated lobby switch actuation and delay means for reseting the storage means after a predetermined maximum time period.

Still a further object of the present invention is to provide a television monitoring system in accordance with the primary object that includes means for interrupting the normal audio signal associated with the television signal when the lobby area picture is being observed.

An additional object of the present invention is to provide a television monitoring system that is readily adapted to existing monitoring systems, that can be constructed at a reasonable cost and that is relatively uncomplex in design.

SUMMARY OF THE INVENTION

The television monitoring system of the present invention generally includes in its organization a central station, preferably the main entrance lobby of an apartment house, and a plurality of stations remotely disposed from the central station which stations are normally located, one in each unit of the apartment house. The central station includes a television camera directed toward at least a portion of the main entrance lobby where a person may enter, and a plurality of manually actuable switch means, one switch means being associated with each remote station. A conductor means interconnects each switch means of the central station with its associated remote station. In addition, a video signal from the television camera at the central station is preferably coupled to all of the remote stations.

Each remote station comprises a television receiver including means for receiving both a normal video signal from a local television station, for example, and a video signal from the television camera in the main lobby. Each remote station includes, in addition, means responsive to actuation of its associated switch means in the central station, for interrupting the normal video signal and causing the video signal from the central station camera to be displayed at the television receiver. In a preferred embodiment of the invention each of the remote stations includes a relay means which is energized when its associated switch means is actuated, and in turn through its contacts causes a display of the central station area, and an interruption of the normal audio signal associated with the previously displayed picture of a selected channel.

BRIEF DESCRIPTION OF THE DRAWINGS

Numerous other features, objects and advantages of the invention should now become apparent upon a reading of the following detailed description in conjunction with the accompanying drawing which is a partially circuit, partially block diagram of one monitoring system constructed in accordance with the principles of the present invention.

DETAILED DESCRIPTION

In the specification and claims of this application the "normal video signal" refers to the video signal received from a television transmitter located remote from the dwelling house and may include local television station signals and television signals received via a cable television service. The "normal audio signal" is the audio signal commonly associated with the normal video signal and usually these two signals are transmitted as one electrical signal by known modulation techniques.

Referring now to the sole drawing, there is shown a partially circuit, partially block diagram of the monitoring system including a central station 10 and one, of a plurality of, remote stations 12. The central station is preferably the main entrance of an apartment house or other multiple dwelling, and each remote station is preferably located in one of the units of the apartment house.

The central station 10 includes a television camera 14 which is directed at the entrance lobby area, and a plurality of manually actuable switch means shown in the drawing as switch bank 16. Switch bank 16 has one switch associated with each remote station and in the drawing three such switches **16*a*–16*c*** are depicted.

The remote station depicted in the drawing, namely station A, includes a television receiver for receiving both a normal video signal from a local television station, for example, and a video signal from the television camera in the lobby, and a and a responsive relay KA. Means are also shown in the drawing interconnecting the lobby station and each remote station for enabling voice communication there between.

Referring now to the details of the lobby station 10 there is included a time delay T1 with its associated contact, relay coils K2 and K3 with their associated contacts, two storage batteries B1 and B2, buzzer BR and other associated circuitry. Each of the switches **16*a*–16*c* are single pole switches having their fixed contacts interconnected and coupled to one side of contacts K2c and K2o of relay K2. The other side of contacts K2c and K2o are connected to the positive terminal of batteries B1 and B2, respectively. In the disclosed embodiment both batteries B1 and B2 are 24 volts DC batteries that may be of conventional design. The moveable contacts of manually actuable switches 16*a*–16*c*** interconnect via diodes D*a*-D*c* to stations A-C, respectively. In an actual embodiment of the invention many more stations may be used. However, for the sake of simplicity a total of three stations are represented by the three switches **16*a*–16*c*** in the drawing of this application.

The moveable contacts of switches **16*a*–16*c*** also interconnect by way of diodes E*a*-E*c*, respectively, to buzzer BR. The other side of the buzzer connects to the negative terminal of battery B2. The cathodes of diodes D*a*-D*c* couple respectively to a third set of diodes shown as diodes F*a*-F*c*. The cathodes of diodes F*a*-F*c* are interconnected, as shown, and couple to resistor R and time delay T1 which may have a time delay on the order of 30 seconds. The other side of time delay relay T1 connects to latch line 20 and the other side of resistor R couples by way of the parallel combination of relay K2 and capacitor C to latch line 20. The normally closed contacts, T1*c* of time delay T1 and K3*c* of relay K3, are connected in series between one side of capacitor C and the minus terminal of battery B1.

The lobby station also includes relay K3 which has its normally open contact K3*o* coupled between the door release relay and transformer TR1. Transformer TR1 has a primary winding P1 that is coupled to the 110 volt AC line and a secondary winding S1 that couples to relay contact K3*o* and also to the door release relay. Transformer TR1 is a step-down transformer and the voltage developed across the secondary winding S1, when contact K3*o* is closed may be on the order of 18 volts AC.

The system of the present invention includes a video conductor 22 that connects by way of video amplifier 24 from television camera 14 to each of the remote stations in a particular system. Both the camera 14 and video amplifier 24 may be of conventional design.

In the disclosed embodiment the relay coil K3 has one side connected to the negative terminal of battery B1 and has its other side coupled in series to each remote station. Each of these stations, such as station A shown in the drawing, includes a door release switch 30 which may be actuated to energize door release relay K3, and a talk/listen switch 32 for controlling the audio communication between the interrogated remote station and the central station.

The system also includes an audio amplifier 36 located in the central station, having one input from the positive terminal of battery B2 and a two conductor line 41, coupled to speaker/microphone 40 of the central station. Another speaker/microphone arrangement 43 is located in station A and interconnects to the two conductor voice line 41.

Referring now to the details of station A there is included a television receiver 42, a relay coil KA, an indicator lamp L1 which is illuminated when relay coil KA is energized, four relay contacts KA1–KA4 associated with relay coil KA and the control switches 30 and 32. The talk/listen control switch 32 enables communication from the central station to the remote station when the switch 32 is opened, and upon closure of the switch 32 a relay (not shown) in the audio amplifier then enables communication from the remote station to the central station wherein a person in the lobby may hear the person in the remote station at speaker/microphone arrangement 40. The audio communication means shown in the drawing including audio amplifier 36 and arrangements 40 and 43 may be of conventional design as presently used in existing intercom systems.

The positive terminal of battery B1 interconnects to all of the separate stations in an apartment house. In apartment station A, for example, the positive 24 volt level connects via normally open contact KA1 associated with relay coil KA to one side of relay coil KA. The other side of coil KA connects to latch line 20. This first contact KA1 is a latching contact which holds the KA relay coil latched after its associated switch 16a has been released. A second contact KA2 associated with relay coil KA closes when the relay coil is energized to enable voice communication over voice line 41. A third contact KA3 is normally open prior to energization of relay coil KA and closes to couple the video signal from video line 22 to television receiver 42. A final contact KA 4 couples from the shield SH to the audio input of the television receiver and interrupts the audio signal when the relay coil KA is energized. Diode 45 couples across battery B1, as shown, when contacts T1*c* and K3*c* are closed and isolates line 20 from the positive 24 volt line when relay KA deenergizes.

The television receiver 42 also includes another video input which is the normal video signal typically received from an antenna, demodulated and subsequently displayed as a television picture. The input at point 46 is preferably not coupled to the same internal point of receiver 42 as is the video input at point 48 but is coupled to a portion of the television receiver after the front portion and this signal overrides the input video at point 48.

The operation of the system depicted in the drawing commences when a person enters the lobby area and manually actuates switch 16a, for example. When this occurs a positive voltage from battery B1 is coupled through contact K2*c* of the initially unenergized relay coil K2 via diode D*a* to one side of relay coil KA. The other side of relay coil KA couples by way of latching line 20 to the negative terminal of battery B1 through normally closed contacts T1*c* and K3*c*, and relay KA is almost immediately energized when switch **16*a* is closed. With relay KA energized the first contact KA1 thereof closes to maintain the positive 24 volts on relay coil KA even after switch 16*a* is released. The second contact KA2 completes the audio circuit via conductors 41** between the central station and remote station A. It is noted that when contact KA2 closes that all other similar contacts in other remote stations are open thereby enabling voice communication only with the station A. In accordance with one feature of the present invention only one station relay (KA, KB . . . ) can be energized at a time as described in more detail hereinafter.

The closing of the third contact KA3 couples the video signal of line 22 to point 46 thereby displaying the lobby area on the television receiver. The last contact KA4 interrupts the normal audio signal when relay KA is energized.

Thus, if an occupant is watching a particular television program and the associated switch **16*a* is depressed, the lobby picture is automatically displayed without having to tune in to any predetermined station. The occupant can then determine whether or not to allow entry to the person in the lobby. The occupant may, in addition, use talk/listen switch 32 for audio communication. In the embodiment shown switch 32 is normally open for communication from lobby to station A and is closed by the occupant for opposite direction communication. If it is decided to let the person in the lobby into the building door/release switch 30 is closed momentarily and relay coil K3 is then connected across battery B1 through the positive 24** volt line interconnecting all stations thereby energizing relay K3.

Once relay K3 is energized its normally closed contact K3c opens and the latch line 20 is opened. This causes relay KA to fall out, and its associated contacts KA1–KA4 all open thereby returning the system to its normal condition with no station being interrogated.

Also, when switch 30 is depressed and relay K3 is energized its contact K3*o* closes and a circuit is provided through the secondary S1 of transformer TR1 to the door release relay (not shown) causing the apartment lobby door to open and enabling the person in the lobby to enter.

In the event that there is no occupant in an apartment unit such as apartment A, it is not desirable to keep relay KA energized for a long period as other people may desire to enter by buzzing other apartments. Thus, the time delay relay T1 having a time delay of 30 seconds, for example, is used to release relay KA after the 30 second interval. When the relay KA has been energized by depressing the manually actuable switch **16*a* a positive voltage is fed by way of forward-biased diode Fa to time delay T1. Time delay T1** is a thermal delay which has a normally closed contact T1*c* associated therewith. After the 30 second interval contact T1*c* opens and relay KA is deenergized in a similar manner to when the door release button 30 is depressed to deenergize relay K3 which in turn also deenergizes relay KA.

One other problem which has been recognized in developing the present invention is that a person in the lobby may deliberately attempt to depress a plurality of switches thereby signaling a plurality of associated remote stations, setting each of their relays and causing a great power drain upon the batteries contained in the central station. To alleviate this problem relay K2 has been included and has a time delay circuit including resistor R and capacitor C associated therewith. The values of the resistor and/or capacitor can be choosen so that relay K2 latches after 200 millisecond, for example, when capacitor C has charged sufficiently to energize the relay coil.

For example, when the switches **16*a*, 16*b* and 16*c* are depressed in sequence the relay KA is energized first and after a very short delay of about 200 milliseconds relay K2 latches and the positive terminal of battery B1 is uncoupled from switch bank 16** by way of now open, normally closed contact K2*c*. Concurrently therewith, the contact K2*o* closes and couples the positive terminal of battery B2 to switch bank 16. With contact K2*o* closed a path is provided to actuate buzzer BR by depressing any switch of bank 16. Buzzer BR is in effect connected across battery B2 when any switch is closed.

When one of the other switches **16*b* or 16*c* is subsequently depressed there is no return by way of latch line 20 and battery B1 to switch bank 16, and thus, the relays in the remote stations associated with switches 16*b* or 16*c*** cannot be energized. Only the first actuated switch in the lobby can energize its associated remote relay.

With the embodiment shown in the drawing, it is possible to depress switch **16*a*, for example, to energize relay KA and then later depress switch 16*a* again to sound the buzzer in the apartment. If, after a predetermined time limit, the door is not released then the time delay T1** activates and returns the system to its normal condition.

Having described and illustrated one preferred embodiment of the invention, other embodiments and modifications of the preferred embodiment are contemplated as falling within the scope of the present invention. For example relays have been shown in the sole drawing but transistor circuitry could be used in its place. In particular each remote relay may be replaced by electronic storage means including a bistable flip-flop, for instance. Also, modes of audio communication may be used other than the one shown in the drawing, or alternatively, the system may operate only with video communication.

The system may also include many parts such as camera 14, video amplifier 24, television receiver 42 and audio amplifier 36 which are considered to be of conventional design and most of which are presently used in existing video/audio communication systems. Because these parts are conventional there detailed design has not been discussed hereinbefore so as not to obscure the principles of the present invention.

What is claimed is:

1. A television monitoring system comprising;

a central station, a plurality of stations remotely disposed from the central station, said central station having an entrance means and including a television camera directed toward at least a portion of the central station area where a person may enter, and a plurality of manually actuable switch means, one switch means being associated with each remote station, and conductor means intercoupling the switch means of the central station with its associated remote station, each said remote station including a television receiver including means for receiving both a normal video signal and a video signal from the television camera, and means responsive to actuation of the associated switch means for coupling the video signal from the television camera to the television receiver in a manner to cause the normal video signal to be overridden by the video signal from the camera.

2. The system of claim 1 and further comprising audio communication means intercoupling the central station and each remote station wherein said means for coupling of a selected station enables said audio communication means intercoupled to the selected station.

3. The system of claim 1 wherein said means responsive to actuation of the associated switch means also decouples the audio associated with the normal video signal upon actuation of the switch means.

4. The system of claim 1 wherein said means responsive to actuation of the associated switch means includes a relay having a plurality of contacts associated therewith.

5. The system of claim 1 wherein each said remote station includes a release switch means that couples via conductor means to an entrance enabling means which is energized upon actuation of the release switch means to allow opening of said entrance means.

6. The system of claim 5 wherein said entrance means includes a door and said entrance enabling means includes a relay which is energized to open the door.

7. The system of claim 5 wherein energizing of said entrance enabling means causes a decoupling of the video signal from the television camera.

8. The system of claim 1 wherein said central station includes interlock means responsive to an actuation of any switch means for preventing a coupling of the video signal from the television camera to local stations associated with a subsequently actuated switch means.

9. The system of claim 1 wherein said means responsive to actuation of the associated switch means includes storage means and said central station includes time delay means for resetting or deenergizing the storage means after a predetermined time period.

10. A video monitoring system for use in a building having an entrance lobby with a normally secured door which is opened to allow a person access to other parts of the building and a plurality of units contained in the building, comprising a television camera directed toward at least a portion of the entrance lobby where a person may initially enter the building, a plurality of manually actuable switches located in the lobby, one switch being associated with each unit of the building, conductor means interconnecting each switch in the lobby with its associated unit, a television receiver in each said unit capable of receiving normal television signals from at least local stations and a video signal from the television camera in the lobby, circuit means in each said unit responsive to actuation of the associated lobby switch for coupling the video signal from the television camera to the television receiver for displaying a picture of the lobby area, and a door release switch in each said unit and associated conductor means for causing an opening of said door when said door release switch is actuated.

11. The system of claim 10 wherein said circuit means includes a relay having a plurality of contacts associated therewith.

12. The system of claim 11 wherein a first contact of said plurality couples the video signal from the television camera.

13. The system of claim 12 wherein a second contact of said plurality interrupts the audio portion of the normal television signal.

14. The system of claim 13 wherein a third contact of said plurality enables voice communication between the lobby and unit.

15. The system of claim 14 wherein a fourth contact of said plurality latches said relay.

16. Interlock circuitry for use in a television monitoring system having a central station and a plurality of remote stations, said central station having an entrance means and including a plurality of manually actuable switch means, one switch means being associated with each remote station, and conductor means intercoupling the switch means of the central station with its associated remote station, each said remote station including means responsive to actuation of the associated switch means for signaling the occupant of the presence of a person at the central station, said interlock circuitry for preventing operation of more than one means for signaling at a time and comprising;

an energy storage means, conductor means intercoupling one terminal of said energy storage means to said plurality of manually actuable switch means, circuit means responsive to actuation of a first one of said plurality of manually actuable switch means, said circuit means having means associated therewith for interrupting said conductor means and isolating said switch means from said energy storage means for up to a maximum time interval during which time interval actuation of other switch means are prevented from operating signaling means associated with the other switch means.

17. Interlock circuitry as set forth in claim 16 wherein said circuit means is responsive only after a short predetermined interval to actuation of said first one of said switch means.

18. Interlock circuitry as set forth in claim 17 wherein said circuit means includes a relay and associated RC network.

* * * * *